Sept. 15, 1942.　　　A. H. BRODBECK　　　2,296,140
SWING-OUT BROILER
Filed Feb. 7, 1940　　　2 Sheets-Sheet 1
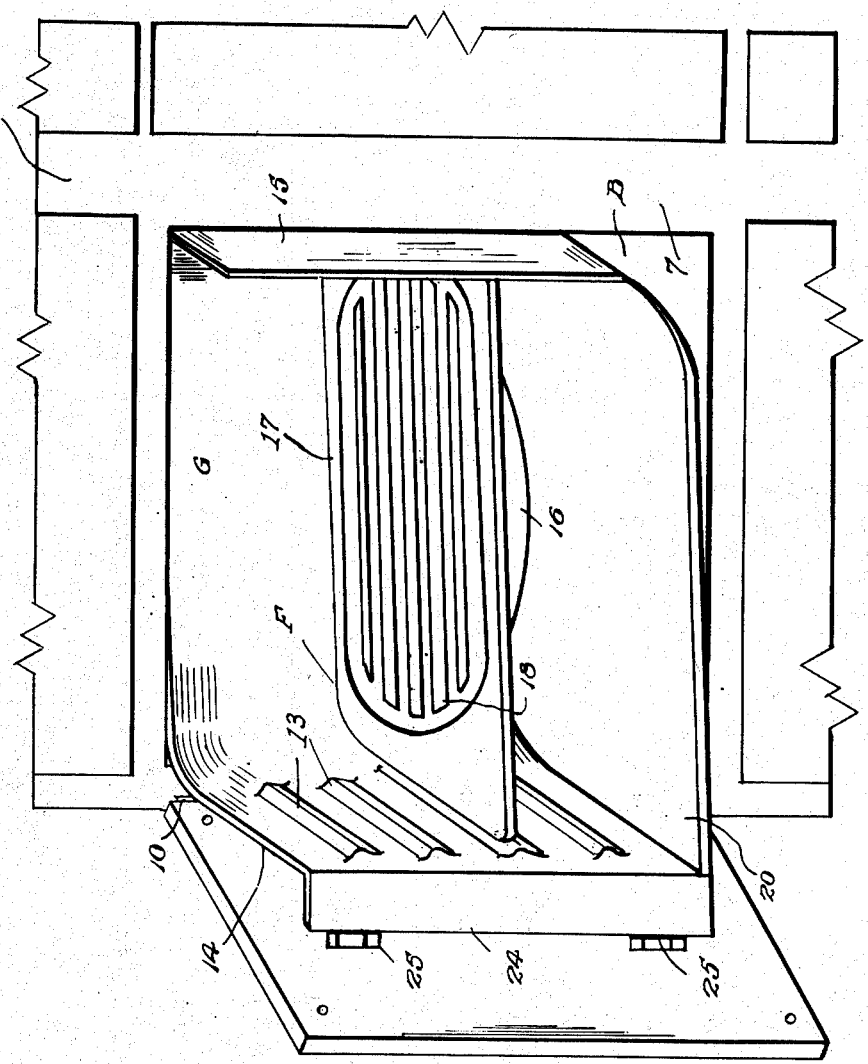
Inventor
A. H. Brodbeck
By Pattison, Wright & Pattison
Attorneys Sept. 15, 1942.   A. H. BRODBECK   2,296,140
SWING-OUT BROILER
Filed Feb. 7, 1940   2 Sheets-Sheet 2
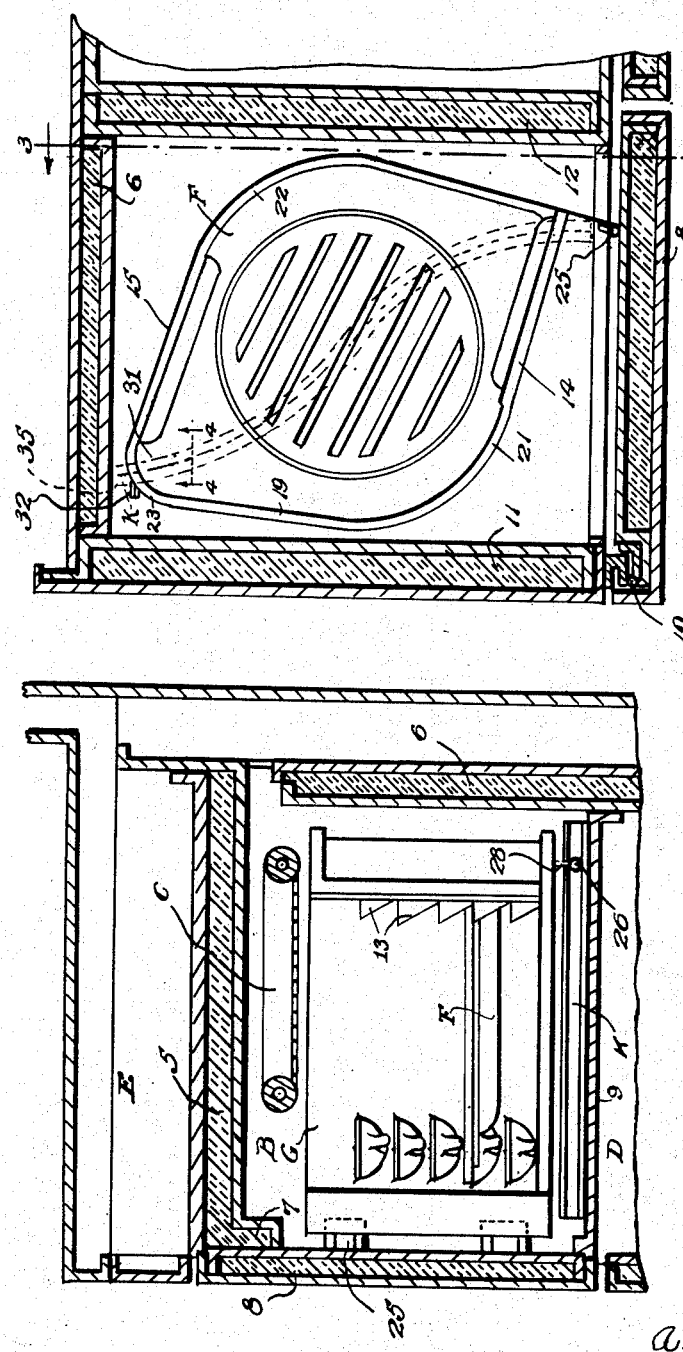
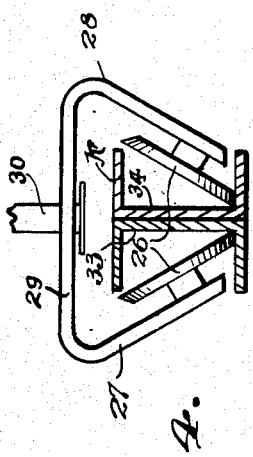
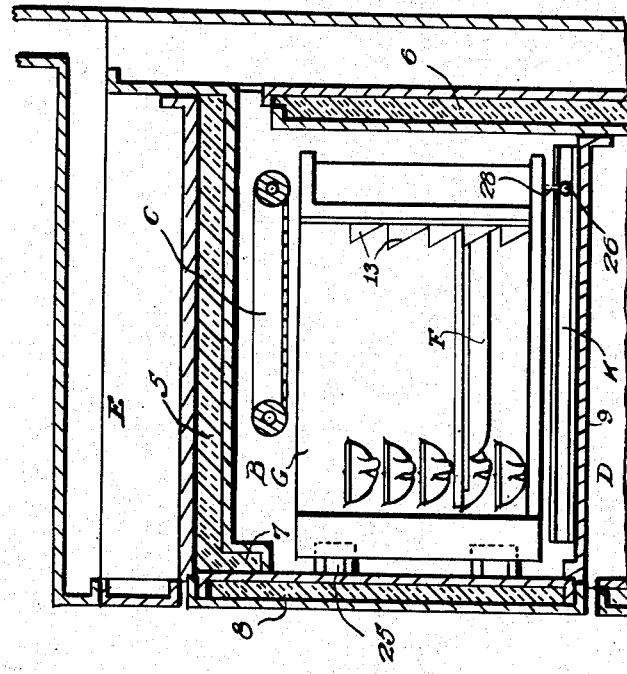
Inventor
A. H. Brodbeck
By Pattison, Wright & Pattison
Attorneys Patented Sept. 15, 1942

2,296,140

UNITED STATES PATENT OFFICE 2,296,140

SWING-OUT BROILER

Almer H. Brodbeck, St. Louis, Mo., assignor to American Stove Company, St. Louis, Mo., a corporation of New Jersey Application February 7, 1940, Serial No. 317,754

11 Claims. (Cl. 126—340)

The present invention has as an object the provision of a swing-out broiler which is extremely simple of construction yet highly efficient in operation and a broiler having numerous advantages over other swing-out broilers used in combination with a broiler oven door which is mounted to swing in a horizontal plane such for instance as is disclosed in the Stockstrom et al. Patent No. 2,027,124, dated January 7, 1936.

The present construction makes it possible to use in a given size of broiler oven a much larger broiling pan or grid than is commonly the case in swing-out broilers used in combination with and operated by a broiler oven door which swings in a horizontal plane.

By being enabled to use a larger broiling grid or pan, that is, one which more nearly coincides with the size of the broiling oven, the center of the broiling pan or grid is disposed more nearly at the center of the oven or compartment which makes it possible to locate the broiler burner at a point further back from the door or front of the compartment than has been possible heretofore in broiling ovens in which the broiling grid or pan is operated by a door which swings in a horizontal plane the result of which reduces the temperature at the front of the stove and oven compartment thereby making for increased comfort to the user of the stove.

The construction by enabling the positioning of the broiling burner at or near the geometrical center of the broiling compartment makes it feasible to use a common burner for heating a baking oven located directly above the broiling oven. Were the broiling burner not so positioned its use for heating a superimposed baking oven would not be feasible due to the fact that with the broiling burner positioned under the front portion of the baking oven uneven heating of the baking oven would result.

The present invention therefore contemplates the provision of a swing-out broiler arrangement having the foregoing attributes and advantages together with other specific advantages and novel features of construction, the exact nature of which will appear from the following description when read in conjunction with the accompanying drawings.

In the drawings:

Figure 1 is a perspective view of the broiling oven end of a gas range, the broiling oven door being illustrated in an open position with the broiling pan or grid pulled outwardly from the broiling oven.

Figure 2 is a horizontal sectional view through the range and construction appearing in Figure 1 of the drawings.

Figure 3 is a vertical sectional view on the line 3—3 of Figure 2 of the drawings, looking in the direction indicated by arrow.

Figure 4 is a vertical sectional view taken on the line 4—4 of Figure 2 looking in the direction indicated by arrow.

Inasmuch as the specific range construction with which the present swing-out broiler can be advantageously used may vary widely in accord with the wishes or desires of the range user or purchaser, no attempt is made to illustrate a range of any particular construction or burning any particular type of fuel.

The range as an entirety is designated at A and has in one end thereof a broiling oven or compartment B in the upper end of which is a burner C. In the present instance the baking oven D is illustrated as being positioned below the broiling chamber but in many types of ranges this baking oven is above the broiling chamber and would be in the position occupied by what is in the drawings a cooking top burner chamber E. When the baking oven is above the broiling chamber the broiling chamber is not provided with a heavily insulated top 5 as illustrated but a construction is utilized which will permit the burner C to be used as the combined heating and cooking element for both the broiling and baking ovens which is possible due to the fact that the burner C is substantially centered in respect to the broiling chamber and to any oven or chamber disposed thereabove.

The range illustrated is of the so-called table top type and the heretofore mentioned cooking top burner chamber E ordinarily has within it four cooking top burners which in the present drawings are not illustrated inasmuch as they form no part of the present invention.

The burner C is intended to illustrate a gas burner but it will be understood that a burner utilizing other suitable fuel could be equally well utilized.

The broiling chamber or oven is defined by the hereinbefore mentioned insulated top 5, an insulated rear wall 6, the range front frame 7 in combination with the insulated broiling oven door 8 and a bottom 9. The broiling oven side walls are designated as 11 and 12 and are of the double wall insulated type.

The broiler door 8 is mounted to swing in a horizontal plane upon suitable hinges 10 mounted on the range front frame 7 at one side of the broiler door opening in said frame.

In accord with the usual practice the broiling chamber or oven is of an angular shape in cross sectional configuration. Most broiling chambers and cooking ovens in ranges are either rectangular or square in cross sectional configuration.

A broiling grid or pan which serves as a support for food or cooking utensils is designated as an entirety at F and is adjustable vertically and also horizontally movable out of and into a carrier G by reason of having sliding supporting engagement with suitable longitudinally elongated supporting elements 13 disposed in spaced parallel relationship along the inner face of the forwardly extending side walls 14 and 15 of the carrier.

The tray need not necessarily be of any specific construction but I preferably utilize a tray having a depressed center portion to form a sump 16 above which is removably supported a grid-like element 17 provided with a plurality of elongated slot-like apertures 18 for the passage of grease, meat juices and the like into the sump to prevent smoke.

The carrier is made up of the aforementioned side walls 14 and 15, a rear wall 19 and a bottom 20. This carrier is in general of a rectangular configuration with the exception that three of its corners are rounded so as to assure clearance between the carrier and the side and rear walls of the broiling chamber when the carrier is pulled outwardly from the broiling chamber in the manner hereinafter to be described. These rounded corners are designated as 21, 22 and 23 respectively. The corners 21 and 22 which are diagonally disposed are rounded to a much greater degree than the rear corner 23 of the carrier.

The carrier side wall 14 at its front edge is elongated and bent at right angles to provide a vertically extending column or panel 24 which is pivotally connected, as by hinges 25, to the inner wall or face of the broiler door 8 at a point approximately midway between the vertical center of the door and its free edge or end. These hinges constitute a connection which cause the carrier G to be moved with the broiler door as said door is opened and closed and further constitute a support.

The main supporting medium for the carrier is however a pair of rollers 26 which are rotatably supported upon the lower ends of the downwardly and inwardly extending arms 27 and 28 of a fork shaped member designated as an entirety at H. The arms 27 and 28 of this member at their upper ends are joined together by a horizontally disposed cross arm 29 which centrally of its length is pivotally connected by means of a shaft 30 or the like to the under side of the rear corner 31 of the carrier by a suitable connection means as indicated at 32.

These rollers, when the carrier is moved into and out of the broiling chamber by the opening and closing of the door 8 thereof, roll along and are guided by a suitable trackway K positioned upon and suitably secured to the bottom 9 of the broiling chamber.

This trackway is made up of a pair of channel irons 33 and 34 placed back to back. By reference to Figure 4 of the drawings it will be seen that one each of the rollers 26 are positioned at opposite sides of the backs of the channel irons which compose the trackways.

The combined track and guideway K has its inner end positioned at the rear of the broiling chamber and adjacent the left corner thereof, as viewed in Figure 2 of the drawings, at a point 35. From this point the trackway extends forwardly and is curved to the right until it reaches a point approximately at the center of the chamber bottom from which it then extends further forwardly and is curved to the left to terminate adjacent and in alignment with the carrier hinges 25 when the oven door is closed and the carrier is in its retracted position.

Upon pulling the oven door 8 to an open position this track and guideway in conjunction with the guide and supporting element H guide and support the carrier in its outward movement from the broiling oven in a manner whereby the carrier is always adequately supported in conjunction with its hinges 25 and guided in a manner whereby the largest possible carrier in respect to the size of the broiling chamber can be utilized and still avoid abutment with the walls of the broiling chamber as it is pulled outwardly therefrom with the opening of the broiler door.

From the description given it will be understood that as the oven door is opened the carrier with the broiling grid or pan is moved outwardly from the oven into the position illustrated in Figure 1 of the drawings at which time a full view of the food or utensils is afforded the operator of the range so that full visual inspection of the cooking operation is obtained.

The construction is such that during the outward movement of the carrier it is rotated approximately ninety degrees. The point of pivotal connection between the carrier and the door is moved substantially from one side of the oven to and even beyond the opposite side while the inner rear left corner of the carrier is moved in the opposite direction a distance substantially equal to the width of the oven compartment.

With this construction and by rounding the obliquely disposed corners 21 and 22 of the carrier and broiling grid or pan it is possible to provide a broiling grid or pan having a size unusually large in respect to the internal dimensions of the oven chamber when it is realized that the carrier and broiling grid or pan are swung outwardly by the operation of an oven door mounted to swing in a horizontal plane.

The construction is one which provides a broiling grid or pan carrier having adequate rigidity, which provides for selective positioning of the grid in respect to the broiler burner and automatically provides for full visual inspection of the cooking operation upon the opening of the broiling oven door.

It is to be recognized that detailed changes and alterations in specific construction and in the specific instrumentalities used can be made without departing from the spirit of the invention which is to be limited only within the scope of the hereinafter appended claims.

I claim:

1. In a range, a broiling oven having a door opening at one side thereof, a door pivotally mounted at one side of said opening to swing in a horizontal plane and adapted to close said opening, a carrier within said oven provided with side supports in separated relationship, a broiling grid or pan mounted on said carrier supports, one carrier support being disposed adjacent the door opening of said oven and the front end of said broiling grid or pan being disposed adjacent that oven side wall nearest the free end of said oven door, means pivotally interconnecting the inner side of said door and said adjacent carrier support, a trackway within said oven, a combined carrier support and guide means movable over said trackway, and said trackway extending from front to rear of said oven and upon the opening of said oven door guiding said carrier in a manner to prevent said carrier or the broiling grid and pan therein from engaging the walls defining said oven and to position the front edge or end of said broiling grid or pan at and beyond the front of the range, for the purpose described.

2. In a range, a broiling oven having a door opening at one side thereof, a door pivotally mounted at one side of said opening to swing in a horizontal plane and adapted to close said opening, a broiling pan or grid within said oven and having a size and configuration approximating the cross sectional size and configuration of said oven, a carrier for said grid or pan, a pivotal connection between said carrier and the inner side of said door at a point adjacent the free vertical edge of said door, a trackway in said oven extending from the front to the rear thereof, a support movable over said trackway and having supporting engagement with said carrier at a point beneath an inner rear corner of said grid or pan, the attachment of said carrier with said door operating to move the carrier out of and into said oven as said door is opened and closed, and said trackway in combination with the pivotal connection of said carrier with said door acting as said door is opened and closed to rotate said carrier approximately ninety degrees, whereby when the carrier is within the oven the front end of the broiling grid or tray is positioned opposite one of the side walls of the oven and when the carrier is moved outwardly presents the front end of said grid and carrier at and beyond said oven door opening.

3. In a range, a broiling oven having a door opening at one side thereof, a door pivotally mounted at one side of said opening to swing in a horizontal plane and adapted to close said opening, a carrier within said oven of an approximate U shape in cross sectional configuration, the upper end of said carrier being open and the open side of said carrier constituting the front thereof, a broiling grid or pan carried by the side walls of said carrier, the open front end of said carrier being positioned in said oven at approximately right angles to the oven door opening, a pivotal connection between the inner side of said door and the adjacent side wall of said carrier, a pivotally mounted support adjacent that rear corner of the carrier which is obliquely disposed in respect to the free vertical edge of the door, a combined track and guideway in said oven extending from front to rear thereof from a point adjacent the pivotal connection of the carrier with the door to a point below said pivotally mounted carrier support, said pivotally mounted carrier support being movable over said trackway, and the parts cooperating so that the carrier during its outward movement from the oven is rotated approximately ninety degrees to present the open front end of the carrier and the front end of the broiling grid or tray at and beyond the oven door opening.

4. In a range, a broiling oven having a door opening at its front, a door pivotally mounted at one side of said opening to swing in a horizontal plane and adapted to close said opening, a carrier within said oven having an open front disposed in opposed relationship to one of the side walls of said oven, a broiling grid or pan carried by said carrier and having its front disposed at the open front of said carrier, a pivotal connection between said carrier and said oven door, a guideway extending from front to rear of said oven, a support provided with rollers movable along said guideway, a pivotal connection between said support and said carrier, and said guideway acting to rotate said carrier approximately ninety degrees upon the outward movement of said carrier from said oven as said oven door is opened to present the front of said carrier and the front of said broiling grid or pan at and beyond said oven door opening, for the purpose described.

5. In a range, a broiling oven having a door opening at its front, a door pivotally mounted at one side of said opening to swing in a horizontal plane and adapted to close said opening, a carrier in said oven having a vertical edge pivoted to said door to swing horizontally in said oven when said door is opened or closed, a burner substantially geometrically centered in respect to said oven and in the upper end thereof, a broiling grid or pan within said oven and having its center disposed substantially beneath the center of said burner, the front of said grid or pan being disposed in opposed relationship to one of the side walls of said oven, a pivotal connection between said carrier and said oven door, a support movable through said oven and having connection with said carrier, and means operating in conjunction with said movable support for causing said carrier to be rotated approximately ninety degrees as the grid or pan is pulled outwardly from the oven by the opening of said oven door and vice versa.

6. A range oven having a horizontally swinging door, a horizontal U-shaped carrier in said oven, said carrier being provided with vertically disposed side walls in opposed separated relationship, a hinge connecting the outer edge of one of said walls of said carrier to said door, a pan or the like supported on the inner sides of said walls of said carrier, a track having a shape approaching an S extending across the bottom of said oven, and a supporting member on the lower portion of the carrier engaging said track as the carrier is moved in and out of the oven by the opening and closing of said oven door.

7. In a range, a broiling oven having a door opening at one side thereof, a door pivotally mounted at one side of said opening to swing in a horizontal plane and adapted to close said opening, a broiling pan or grid within said oven, a carrier for said grid or pan, a pivotal connection between said carrier and the inner side of said door at a point adjacent the free vertical edge of said door, a trackway in said oven, a support movable over said trackway and having supporting engagement with said carrier, the attachment of said carrier with said door operating to move the carrier out of and into said oven as said door is opened and closed, and said trackway in combination with the pivotal connection of said carrier with said door acting as said door is opened and closed to rotate said carrier approximately ninety degrees, whereby when the carrier is within the oven the front end of the broiling grid or tray is positioned opposite one of the side walls of the oven and when the carrier is moved outwardly the front end of said grid and carrier is presented at and beyond said oven door opening.

8. In a range, a broiling oven having a door opening at its front, a door pivotally mounted at one side of said opening to swing in a horizontal plane and adapted to close said opening, a carrier within said oven having an open front disposed in opposed relationship to one of the side walls of said oven, a broiling grid or pan supported in said carrier and having its front disposed at the open front of said carrier, a pivotal connection between said carrier and said oven door, a guideway extending from front to rear of said oven, a support movable along said guideway, a connection between said support and said carrier, and said guideway and support coacting to rotate said carrier approximately ninety degrees upon the outward movement of said carrier from said oven as said oven door is opened to present the front of said carrier and the front of said broiling grid or pan at and beyond said oven door opening, for the purpose described.

9. A broiling oven having a door opening at one side thereof, a door for said opening pivotally mounted to swing in a horizontal plane, a carrier movably supported in said oven and having a pivotal connection with said door to provide a pivotal carrier supporting point about which said carrier may be rotated to swing in a horizontal plane as said carrier is moved out of and into the oven when the door is opened and closed, a grid or pan supported by said carrier and movable therewith, a guideway in said oven, a member connected to said carrier and movable over said guideway, and said guideway acting to cause said carrier to be partially rotated about is pivotal door support when said door is opened and closed.

10. A construction such as defined in claim 9 wherein, said guideway is fixed against movement, the said member which is connected to the carrier and movable over the guideway is at all times in engagement with the guideway, and said engagement constituting a support for that portion of the carrier which is positioned opposite the oven door.

11. In a range, a broiling oven having a door opening at one side, a door for said opening pivotally mounted to swing in a horizontal plane, a carrier movably supported in said oven, a broiling grid or pan within said oven supported by and movable with said carrier and having an extreme length and width which approximates the length and width of said oven, said grid or pan when within said oven having its front disposed adjacent that side wall of the oven nearest the free vertical edge of said oven door, said carrier having a pivotal connection with said oven door and thereby providing a pivotal carrier supporting point about which said carrier may be rotated to swing in a horizontal plane as said carrier is moved out of and into the oven when the door is opened and closed, and guide means within said oven acting on said grid or pan carrier to partially rotate the carrier about its pivotal door connection when said door is opened and closed.

ALMER H. BRODBECK.